United States Patent [19]
Rapisardi et al.

[11] Patent Number: 5,915,502
[45] Date of Patent: Jun. 29, 1999

[54] BRAKE DISC ASSEMBLY AND A METHOD FOR FABRICATING BRAKE DISC

[75] Inventors: Raymond C. Rapisardi, Norfolk, Va.; Vince J. Austin, Rochester Hills, Mich.

[73] Assignee: Varga North America, Inc., Troy, Mich.

[21] Appl. No.: 08/807,079

[22] Filed: Feb. 27, 1997

[51] Int. Cl.⁶ .................................................. B60T 1/06
[52] U.S. Cl. ...................... 188/18 R; 29/434; 29/898.09; 82/1.11; 82/112
[58] Field of Search ............................ 188/18 R, 218 XL; 29/434, 898.062, 898.07, 898.09; 82/1.11, 112; 451/902

[56] References Cited

U.S. PATENT DOCUMENTS

| | | |
|---|---|---|
| 3,500,589 | 3/1970 | Ellege . |
| 4,262,452 | 4/1981 | Lopez . |
| 4,269,002 | 5/1981 | Venere et al. . |
| 4,503,959 | 3/1985 | Flotow et al. . |
| 4,632,202 | 12/1986 | Narbut . |
| 4,766,702 | 8/1988 | Kinner . |
| 4,827,677 | 5/1989 | Schmitz . |
| 5,125,156 | 6/1992 | Witte . |
| 5,125,187 | 6/1992 | Thiem . |
| 5,193,315 | 3/1993 | Martinez . |
| 5,353,553 | 10/1994 | Miller . |
| 5,381,630 | 1/1995 | Kinner . |
| 5,430,926 | 7/1995 | Hartford . |
| 5,507,686 | 4/1996 | Wolters . |

*Primary Examiner*—P. W. Echols
*Attorney, Agent, or Firm*—Howard & Howard

[57] ABSTRACT

A method for fabricating a brake disc assembly comprising the steps of machining a radially extending gage surface (54) on the support flange (34) of an outer race (32) of a bearing assembly disposed around a hub (14) and inserting a fixture post (72) through a spring washer (68) and through the bore (22) in the hub (14). A clamp plate (74) is disposed in engagement with the base (26) of the brake disc with a washer/nut (78) over the clamp plate (74) to place the post (72) in tension to urge the spring washer (68) against the bearing assembly tomaintain the pre-load on the bearing assembly. The outer race (32) of the bearing assembly is clamped with the gage surface (54) drawn against a gage (84) to properly orient the outer race (32) about a fixed axis A. Thereafter, the clamp plate (74) is engaged by rotating jaws (90) which rotate about a floating axis B. The braking surfaces (30) of the rotor (28) are machined (92) while the floating jaws (90) rotate the hub (14) and brake disc relative to the outer race (32), which is held in a fixed position relative to the machining tools (92).

10 Claims, 4 Drawing Sheets

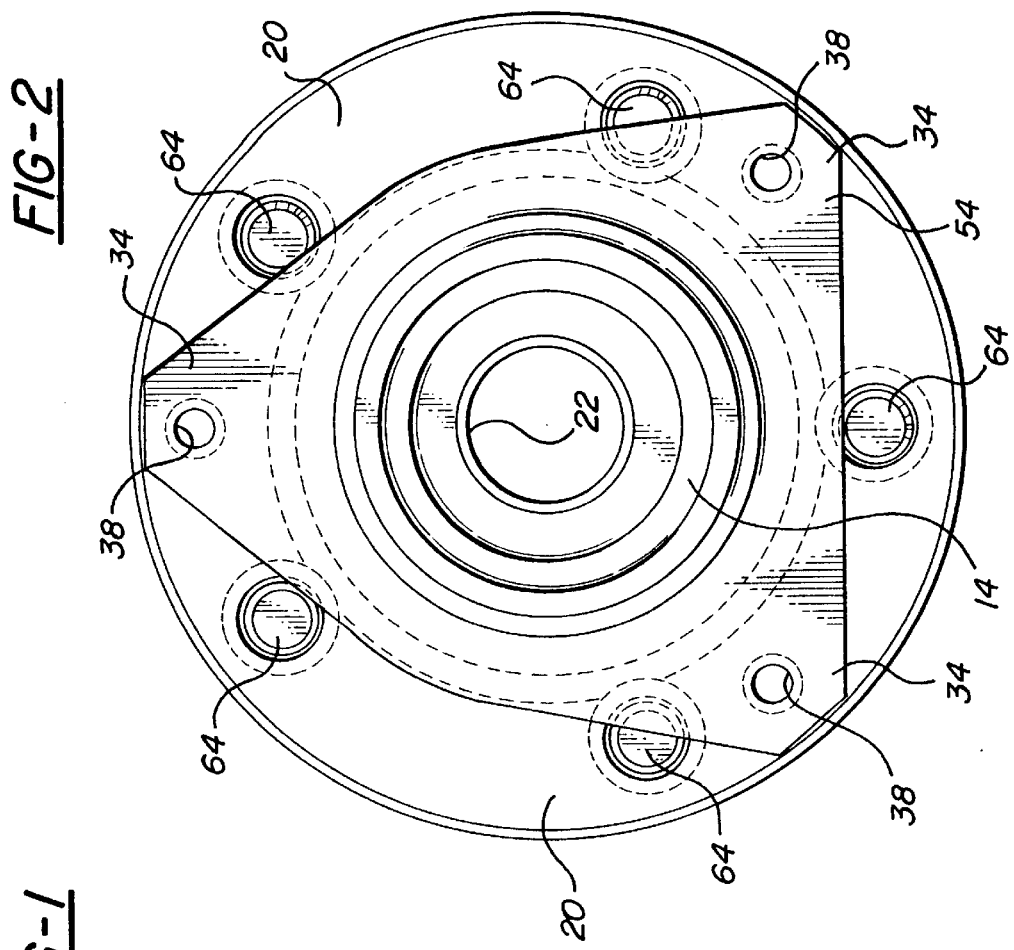
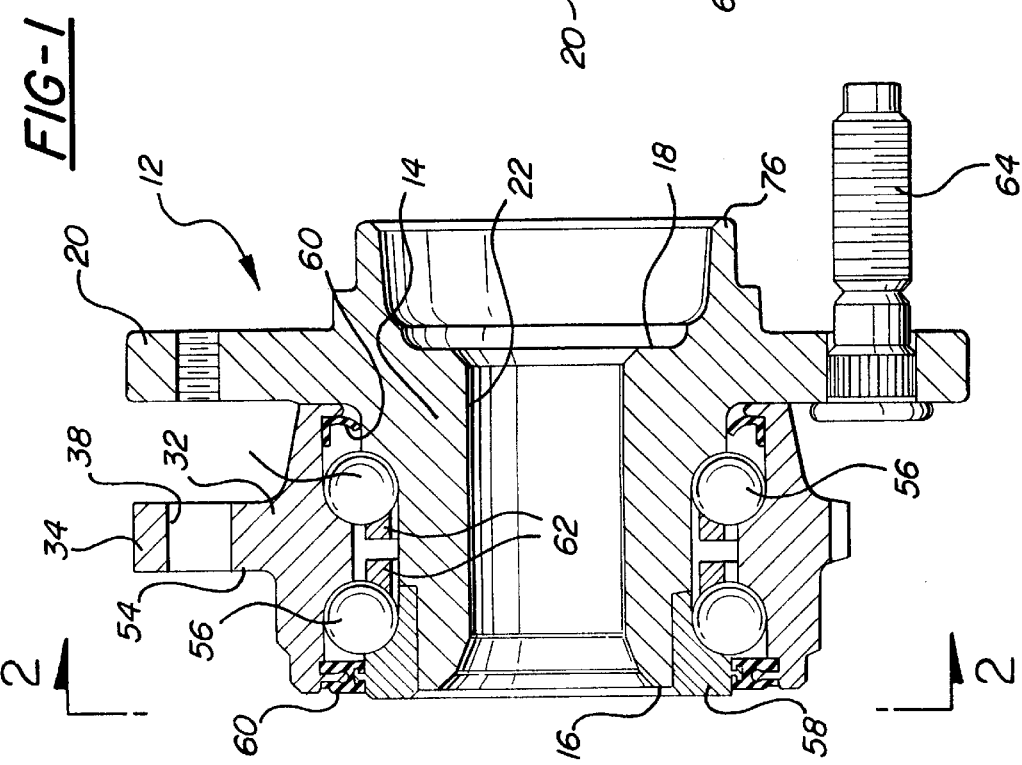

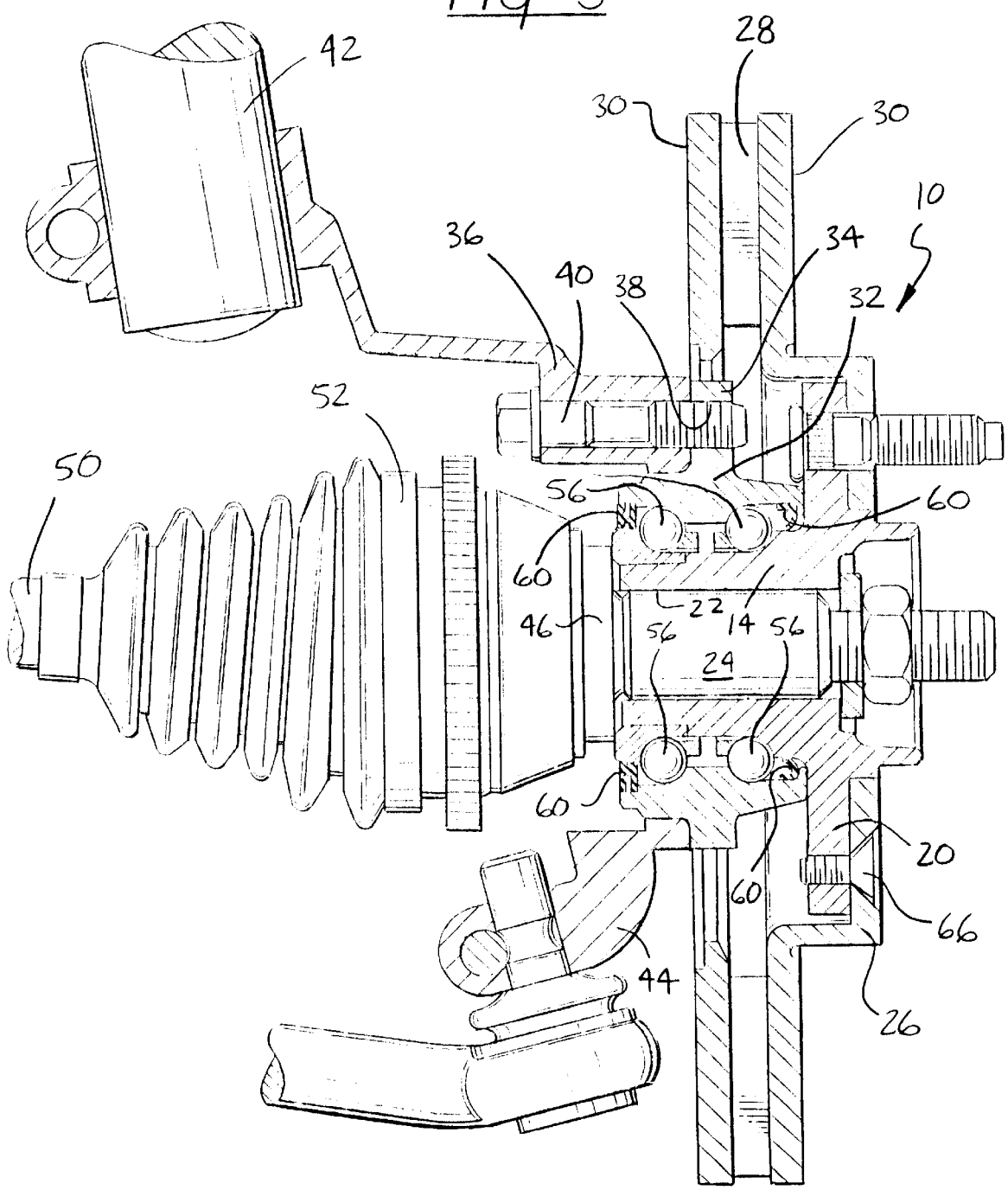

5,915,502

BRAKE DISC ASSEMBLY AND A METHOD FOR FABRICATING BRAKE DISC

TECHNICAL FIELD

The subject invention relates to disc brakes and, more specifically, to a method of fabricating the braking surfaces on the brake disc.

BACKGROUND OF THE INVENTION

With the advent of front wheel drive vehicles and disc brakes, the assembly which is driven by the drive shaft comprises a hub presenting a disc flange supporting a rotor having opposed braking surfaces and with a bearing assembly surrounding the hub with an outer race presenting a support flange for attachment to a king pin of a vehicle. When fully assembled on the vehicle, the braking surfaces of the disc rotor are disposed adjacent the brake pads of the brake disc assembly and separated from engaging the braking surfaces by a brake running clearance when the brake piston is not actuated. When the brake piston is actuated, the brake pads take up the clearance and engage the braking surfaces.

In order to provide this uniform running clearance, the disc rotor must be manufactured to close tolerances with the braking surfaces oriented radially or perpendicularly to the axis of rotation of the rotor when installed. A method of machining to close tolerances on a disc which is mounted through a bearing on a fixed stub shaft is disclosed in U.S. Pat. No. 5,430,926 issued Jul. 11, 1995 to D. J. Hartford. Normally, however, in a front drive or driven wheel, a bearing assembly is disposed about the hub, rather than in the hub as in the aforementioned patent, and after the braking surfaces have been machined. As the bearing assembly is mounted to the vehicle the bearing assembly is loaded to finalize the relationship or orientation between the braking surfaces and the axis of rotation and can result in misalignment of the braking surfaces.

SUMMARY OF THE INVENTION AND ADVANTAGES

Accordingly, the subject invention provides a method for fabricating a brake disc assembly including a hub extending between a drive end and a wheel end and presenting a disc flange and having a bore extending between the ends for receiving a drive shaft, a brake disc having a base attached to the disc flange and a rotor extending radially from the hub and presenting parallel braking surfaces, a bearing assembly surrounding the hub between the drive end and the disc flange for supporting the hub with an outer race presenting a support flange for attachment to a support structure wherein the method comprising the steps of:

clamping the outer race of the bearing assembly in a fixed orientation about a fixed axis;

rotating the brake disc with a drive having a floating axis to allow relative radial movement between the floating axis of the brake disc and the fixed axis of the outer race; and machining the braking surfaces of the rotor while rotating the hub and brake disc relative to the outer race.

By machining the braking surfaces while fixing the outer race of the bearing assembly, the braking surfaces are oriented relative to the center of the bearing axis of rotation so as to reduce disc runout and running clearances.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional view of the hub and bearing assembly processed in accordance with the subject invention;

FIG. 2 is a view taken substantially along line 2—2 of FIG. 1;

FIG. 5 is a cross sectional view of the completed assembly installed in a vehicle.

DETAILED DESCRIPTION OF THE PREFERRED EMBODIMENT

Figure 3:
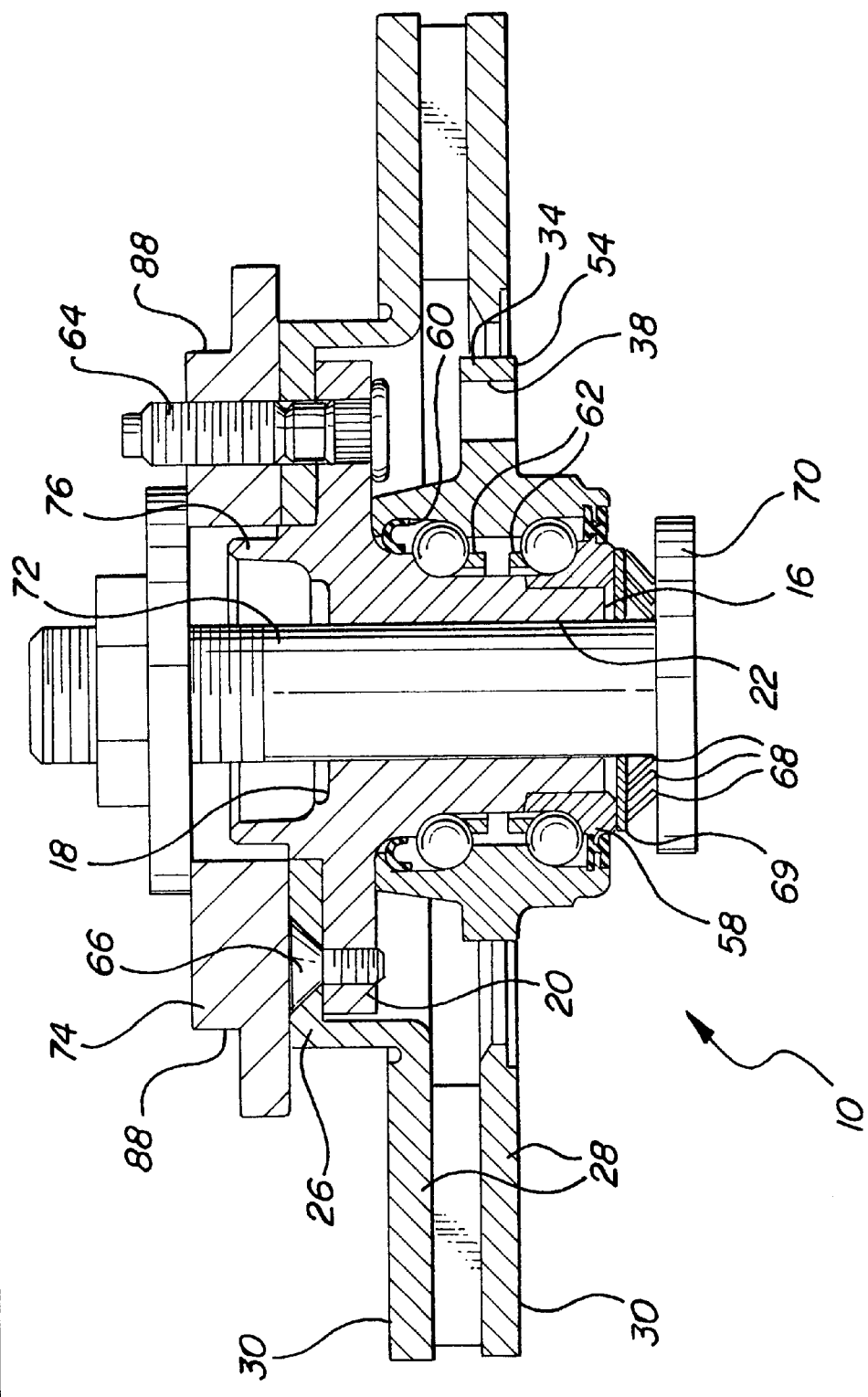
FIG. 3 is a cross sectional view of the brake disc assembly with the clamping fixture attached thereto.

Referring to the Figures, wherein like numerals indicate like or corresponding parts throughout the several views, a hub and brake disc assembly manufactured in accordance with the subject invention is generally shown at 10. The assembly 10 includes a hub and bearing subassembly as generally shown at 12 in FIG. 1. The subassembly 12 comprises a hub 14 extending between a drive end 16 and a wheel end 18. The hub 14 presents a disc flange 20 and has a bore 22 extending between the ends 16 and 18 for receiving a drive shaft 24, as shown in FIG. 5. The subassembly 12 also includes a brake disc having a base 26 attached to the disc flange 20 and a rotor 28 extending radially from the hub 14 and presenting parallel braking surfaces 30. A bearing assembly surrounds the hub 14 between the drive end 16 and the disc flange 20 for supporting the hub 14. To support the hub 14, the bearing assembly includes an outer race 32 presenting a support flange 34 for attachment to a support structure 36. The support flange 34 is generally triangular in peripheral configuration as best shown in FIG. 2. The support flange 34 includes holes 38 at the apexes for receiving bolts 40 which, in turn, attach to the knuckle defining the support structure 36. The knuckle 36 is rotatably supported by a strut 42. A ball joint 44 connects the knuckle to the car structure. The drive shaft 24 has a head 46 in engagement with the bearing assembly and a nut/washer 78 which places the shaft 24 in tension to load the bearing assembly and to rotate the hub 14, which drives a wheel. The driving force is delivered through a drive axle 50 and a universal coupling, i.e., a constant velocity joint, 52, all of which is well known in the art.

The method for fabricating a brake disc assembly in accordance with the subject invention comprises various steps which may be performed in numerous different sequences.

The fist step is the machining of a radially extending gage surface 54 on the support flange 34 of the outer race 32. This is followed by disposing roller elements 56 and the outer race 32 of the bearing assembly around the hub 14 with the gage surface 54 facing the drive end 16 of the hub 14. A race lock member 58 is secured to the hub 14 by a press fit to retain the bearing assembly on the hub 14 under a predetermined pre-load. At the same time, seals 60 are positioned between each end of the bearing assembly and the hub 14 and race lock member 58. Separators or cages 62 are also disposed between the roller elements 56.

A plurality of wheel studs 64 are secured to the disc flange 20 to extend axially therefrom toward the wheel end 18 of the hub 14, the studs 64 being press fitted in holes in the disc flange 20. The studs 64 are threaded and are employed to attach a wheel to the assembly, as is well known in the art.

The next step is the attaching of the base 26 of the brake disc to the disc flange 20 with the wheel studs 64 extending through the base 26 of the brake disc. The base 26 is attached by screws 66.

A spring washer 68 is disposed on the head 70 of a fixture post 72, the fixture post 72 being supported vertically for receiving the hub 14. The spring washer 68 is a plurality of Belleville washers but may comprise an elastomeric, or the like. A washer 69 is disposed between the Belleville washers 68 and the race lock member 58. The hub 14 is placed on the post 72 with the spring washer 68 in engagement with the race lock member 58 as the post 72 is inserted through the spring washer 68 and through the bore 22 to extend from the wheel end 18 of the hub 14. The post 72 snugly engages the interior of the bore 22. While in the vertical position, a clamp plate 74 is disposed about the wheel end 18 and in engagement with the base 26 of the brake disc. The clamp plate 74 has an opening surrounding a projection 76 at the wheel end 18. A washer/nut 78 is disposed over the clamp plate 74 and in threaded engagement with the post 72 to place the post 72 in tension to urge the spring washer 68 against the bearing lock member 58 and the clamp plate 74 against the base 26 of the brake disc. This maintains the pre-load on and retains the bearing assembly to the hub 14; this prevents the race lock member 58 from changing position to maintain the pre-loading the same as occurs when the assembly is mounted on the vehicle as shown in FIG. 5. This also provides a clamp load between the rotor and the hub face.

Figure 4:
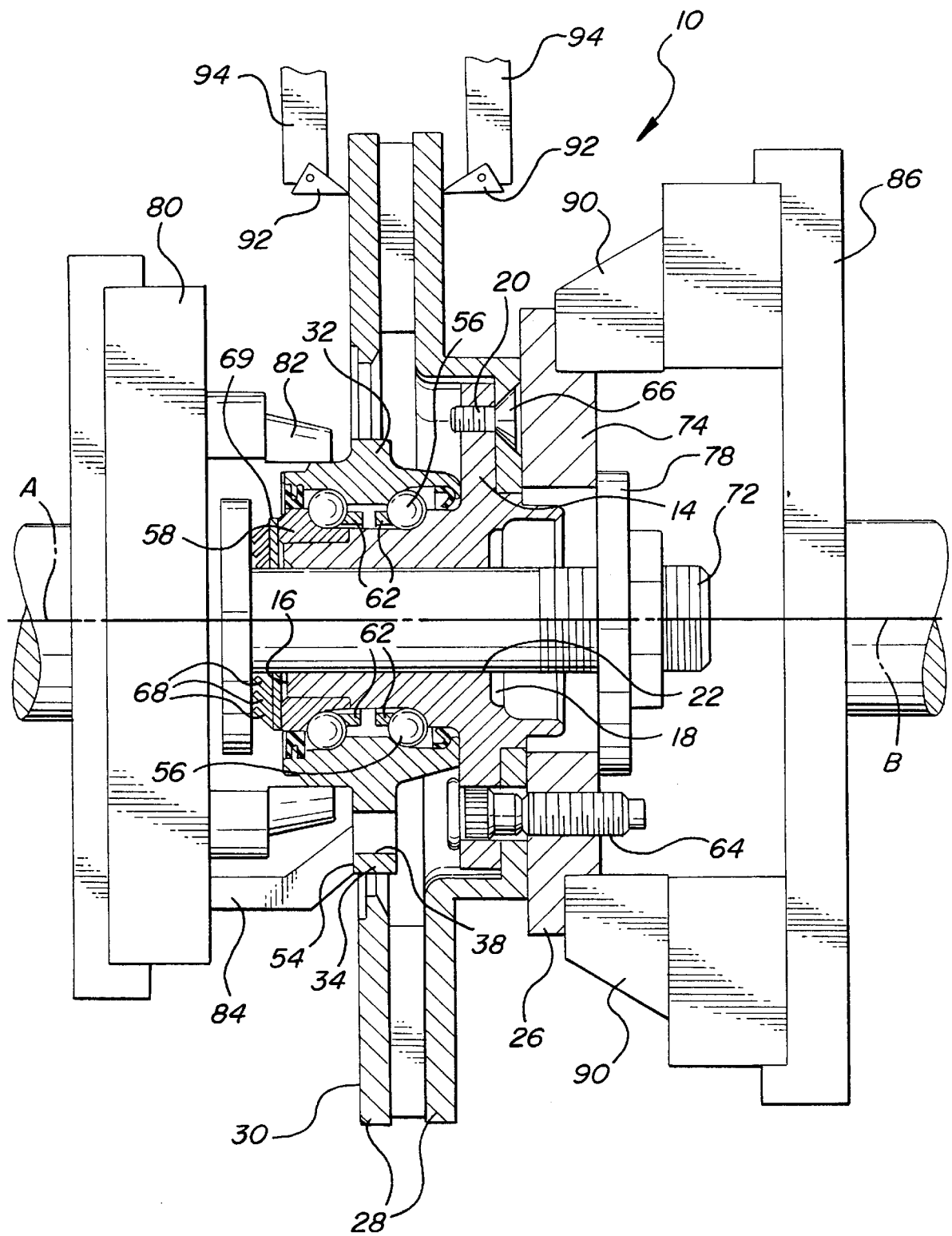
FIG. 4 is a cross sectional view of the assembly of FIG. 3 disposed in the machine for performing the machining of the disc braking surfaces.

This subassembly is then moved to a machining station, as shown in FIG. 4, and placed in position to be grasped by a cam chuck 80 mounted on a stationary machine. The cam chuck 80 has jaws 82 which clamp the outer race 32 of the bearing assembly and draws the gage surface 54 against a gage 84 to properly orient the outer race 32 about a fixed axis A. The gage 84 is shown as engaging only one area of the circumference of the gaging surface 54; however, the gage 84 engages most of the circumference of the gaging surface 54 and includes air sensors to affirm that the gaging surface 54 is properly oriented and engaging the gage 84 in an quadrants.

Once the outer race 32 is clamped in a fixed position relative to the fixed axis A, the next step is engaging the clamp plate 74 with a rotating member 86 to rotate the rotating member 86 about a floating axis B. More specifically, the clamp plate 74 presents a step or shoulder 88 (FIG. 3) and the rotating member 86 is a power chuck with rotating jaws 90. The rotating jaws 90 rotate about an axis B which is floating, i.e., not fixed, to allow some relative radial movement between the outer race 32 and the hub 14 or brake disc.

The final step is the machining of the braking surfaces 30 of the rotor 28 while rotating the hub 14 and brake disc relative to the outer race 32. This machining is accomplished with cutting inserts 92 which are supported on shafts 94 on opposite sides 30 of the disc rotor 28.

Subsequently, the post 72 is removed and the assembly is installed onto the knuckle as shown in FIG. 5.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for fabricating a brake disc assembly including a hub (14) extending between a drive end (16) and a wheel end (18) and presenting a disc flange (20) and having a bore (22) extending between the ends for receiving a drive shaft, a brake disc having a base (26) attached to the disc flange (20) and a rotor (28) extending radially from the hub (14) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

clamping the outer race (32) of the bearing assembly in a fixed orientation about a fixed axis;

rotating the brake disc about a floating axis to allow for relative radial movement between the brake disc and the outer race (32); and machining the braking surfaces (30) of the rotor (28) while rotating the hub (14) and brake disc relative to the outer race (32).

2. A method as set forth in claim 1 including disposing roller elements (56) and the outer race (32) of the bearing assembly around the hub (14); securing a race lock member (58) to the hub (14) to retain the bearing assembly on the hub (14) and to pre-load the bearing assembly.

3. A method as set forth in claim 2 including maintaining the pre-loading on the bearing assembly while machining the braking surfaces (30) by applying a force to urge the race lock member (58) onto the hub (14).

4. A method as set forth in claim 3 further defined as maintaining the pre-loading on the bearing assembly by inserting a fixture post (72) through the bore (22) and placing the post (72) in tension between the race lock member (58) and the wheel end (18) of the hub (14).

5. A method as set forth in claim 4 further defined as disposing a spring washer (68) in engagement with the race lock member (58) to react between the post (72) and the race lock member (58).

6. A method as set forth in claim 5 further defined by disposing a clamp plate (74) about the wheel end (18) and in engagement with the base (26) of the brake disc; and placing the post (72) in tension between the clamp plate (74) and the spring washer (68) to urge the spring washer (68) against the race lock member (58) and the clamp plate (74) against the base (26) of the brake disc.

7. A method as set forth in claim 6 further defied as rotating the brake disc about a floating axis by engaging the clamp plate (74) with a rotating member rotating about a floating axis.

8. A method as set forth in claim 1 including machining a radially extending gage surface (54) on the support flange (34) of the outer race (32); and drawing the gage surface (54) against a gage to properly orient the outer race (32) about a fixed axis while clamping the outer race (32) of the bearing assembly.

9. A brake disc assembly made in accordance with the method of claim 1.

10. A method for fabricating a brake disc assembly including a hub (14) extending between a drive end (16) and a wheel end (18) and presenting a disc flange (20) and having a bore (22) extending between the ends for receiving a drive shaft, a brake disc having a base (26) attached to the disc flange (20) and a rotor (28) extending radially from the hub (14) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

machining a radially extending gage surface (54) on the support flange (34) of the outer race (32);

disposing roller elements (56) and the outer race (32) of the bearing assembly around the hub (14) with the gage surface (54) facing the drive end (16) of the hub (14);

securing a race lock member (58) to the hub (14) to retain the bearing assembly on the hub (14) and to pre-load the bearing assembly;

securing a plurality of wheel studs (64) to the disc flange (20) to extend axially therefrom toward the wheel end (18) of the hub (14);

attaching the base (26) of the brake disc to the disc flange (20) with the wheel studs (64) extending through the base (26) of the brake disc;

disposing a spring washer (68) in engagement with the race lock member (58); inserting a fixture post (72) through the spring washer (68) and through the bore (22) to extend from the wheel end (18) of the hub (14);

disposing a clamp plate (74) about the wheel end (18) and in engagement with the base (26) of the brake disc;

disposing a washer/nut (78) over the clamp plate (74) and on the post (72) to place the post (72) in tension to urge the spring washer (68) against the race lock member (58) and the clamp plate (74) against the base (26) of the brake disc;

clamping the outer race (32) of the bearing assembly and drawing the gage surface (54) against a gaging surface to properly orient the outer race (32) about a fixed axis;

engaging the clamp plate (74) with a rotating member and rotating the rotating member about a floating axis; and machining the braking surfaces (30) of the rotor (28) while rotating the hub (14) and brake disc relative to the outer race (32) to minimize runout.

\* \* \* \* \*